US00RE37763E

(19) United States
(12) Reissued Patent
Wu

(10) Patent Number: US RE37,763 E
(45) Date of Reissued Patent: Jun. 25, 2002

(54) STRUCTURE FOR CONNECTING A HEAD TO A NON-CIRCULAR CYLINDER OF A BICYCLE TIRE PUMP

(76) Inventor: Scott Wu, No. 2, Lane 187, Hsi Hu Road, Ta Li City, Taichung Hsien (TW)

(21) Appl. No.: 09/631,350

(22) Filed: Jul. 18, 2000

Related U.S. Patent Documents

Reissue of:
(64) Patent No.: 6,050,791
Issued: Apr. 18, 2000
Appl. No.: 09/124,778
Filed: Jul. 30, 1998

(51) Int. Cl.[7] ..... F04B 23/00; F04B 39/10
(52) U.S. Cl. ..... 417/521; 417/531; 417/440; 92/146; 92/58.1
(58) Field of Search ..... 417/521, 515, 417/524, 63, 531, 440; 92/164, 169.1, 146, 58.1

(56) References Cited

U.S. PATENT DOCUMENTS 872,043 A * 11/1907 Beck et al. ..... 417/63
1,390,559 A * 9/1921 Huntley ..... 417/63
2,383,181 A * 8/1945 Enslin et al. ..... 417/521
3,907,461 A * 9/1975 Bouder ..... 417/63
5,683,234 A * 11/1997 Chuang et al. ..... 417/531
5,715,554 A * 2/1998 Downs et al. ..... 7/138
5,779,457 A * 7/1998 Chuang et al. ..... 417/467
5,902,097 A * 5/1999 Wu ..... 417/440

* cited by examiner

*Primary Examiner*—Cheryl J. Tyler
(74) *Attorney, Agent, or Firm*—Alan Kamrath; Rider, Bennett, Egan & Arundel, LLP

(57) ABSTRACT

A bicycle tire pump includes a cylinder having two passages defined therethrough which are separated by a board, two openings respectively defined in a top of the cylinder and communicating with the two passages into which two pistons are respectively and movably received. A head is mounted to the top of the cylinder and has two ways defined therein which respectively communicate with the two passages in the cylinder and an outlet of the head. A bolt extends through one of the two passages and is threadedly connected to the head. The bolt has a longitudinal passage defined therethrough which communicates with one of the two ways.

24 Claims, 5 Drawing Sheets

STRUCTURE FOR CONNECTING A HEAD TO A NON-CIRCULAR CYLINDER OF A BICYCLE TIRE PUMP

Matter enclosed in heavy brackets [ ] appears in the original patent but forms no part of this reissue specification; matter printed in italics indicates the additions made by reissue.

FIELD OF THE INVENTION

The present invention relates to a bicycle tire pump, and more particularly, to a structure for connecting the head to the non-circular cylinder of the pump so as to have a strong connection between the head and the cylinder.

BACKGROUND OF THE INVENTION

Referring to FIG. 5, a type of conventional bicycle tire pump includes a non-circular cylinder 41 and a head 40 which is attached to the cylinder 41. The non-circular cylinder 41 includes two circular tubes connected side by side so that there [have] *are* two passages defined in the non-circular cylinder 41 with two sets of piston [device] *devices* ([Figure] not shown) respectively received in the two passages. The head 40 has a valve received therein and [communicate] *communicating* with the two passages so that when operating the two sets of the piston [device] *devices*, pressurized air will flow through the valve. The head 40 generally is connected to the non-circular cylinder 41 simply by way of gluing, and the gluing area between the head 40 and the non-circular cylinder 41 is limited so that the head 40 tends to disengage from the non-circular cylinder 41. Once there [has] *is* leakage defined between the head 40 and the non-circular cylinder 41, the bicycle tire pump is functionless.

The present invention intends to provide a structure for connecting the head to the non-circular cylinder of the bicycle tire pump, wherein a connecting member is securely received in the head and a bolt having a passage defined therethrough extends through the cylinder to be fixedly connected to the connecting member so as to provide a strong connection between the head and the non-circular cylinder. The present invention is designed to mitigate and/or obviate the disadvantage of the conventional tire pump.

SUMMARY OF THE INVENTION

In accordance with one aspect of the present invention, there is provided a bicycle tire pump comprising a cylinder having two passages defined therethrough which are separated by a board, two openings respectively defined in a top of the cylinder and communicating with the two passages. Two pistons are respectively and movably received in the two passages.

A head is mounted to the top of the cylinder and has an outlet defined in one of two ends thereof with a valve received in the outlet. Two ways are defined in the head and respectively communicate with the two passages. A bolt extends through one of the two passages and is threadedly connected to the head, the bolt having a longitudinal passage defined therethrough which communicates with one of the two ways.

An object of the present invention is to provide the bicycle tire pump having two passages defined in the cylinder and the head mounted to the cylinder, a bolt extending through one of the two passages and threadedly engaged with the head to securely connect the head to the cylinder.

Further objects, advantages, and features of the present invention will become apparent from the following detailed description with appropriate reference to the accompanying drawings.

DETAILED DESCRIPTION OF THE PREFERRED EMBODIMENTS

Figure 1:
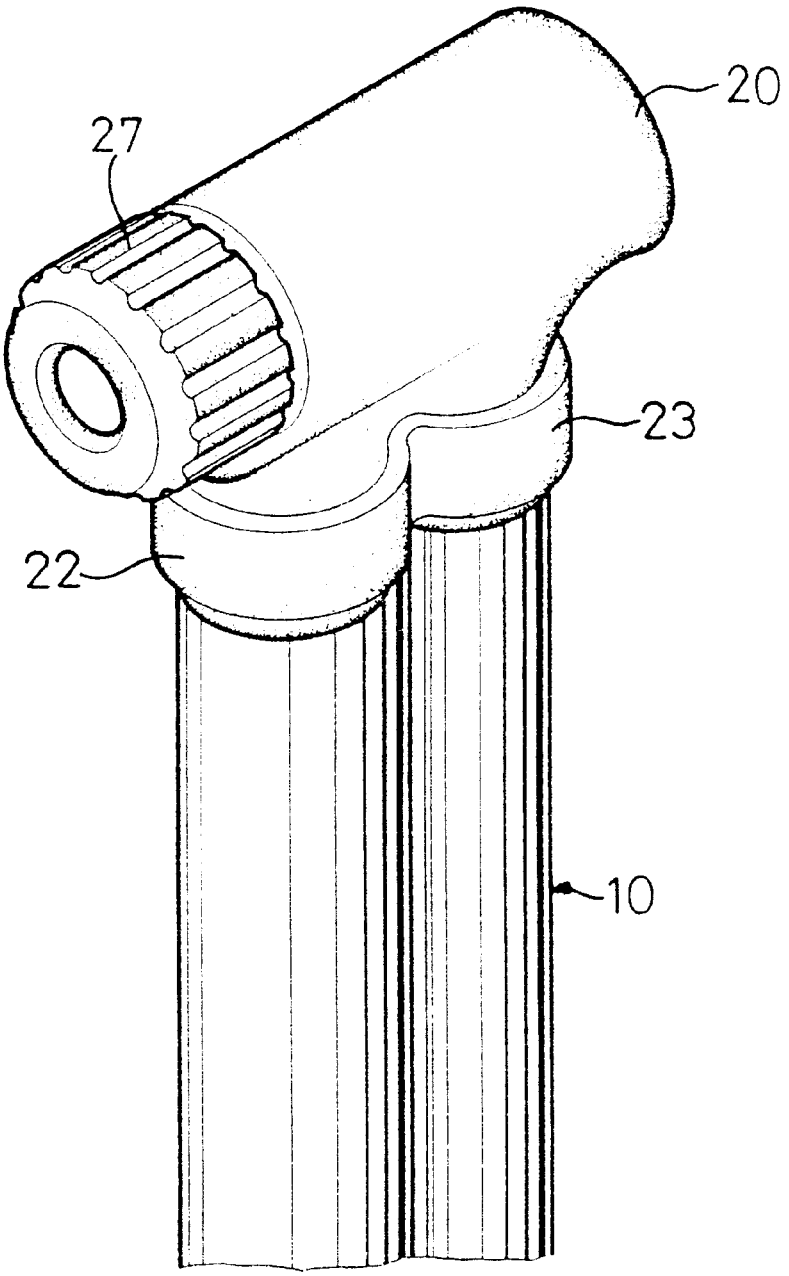
FIG. 1 is a perspective view of the bicycle tire pump in accordance with the present invention.
Figure 2:
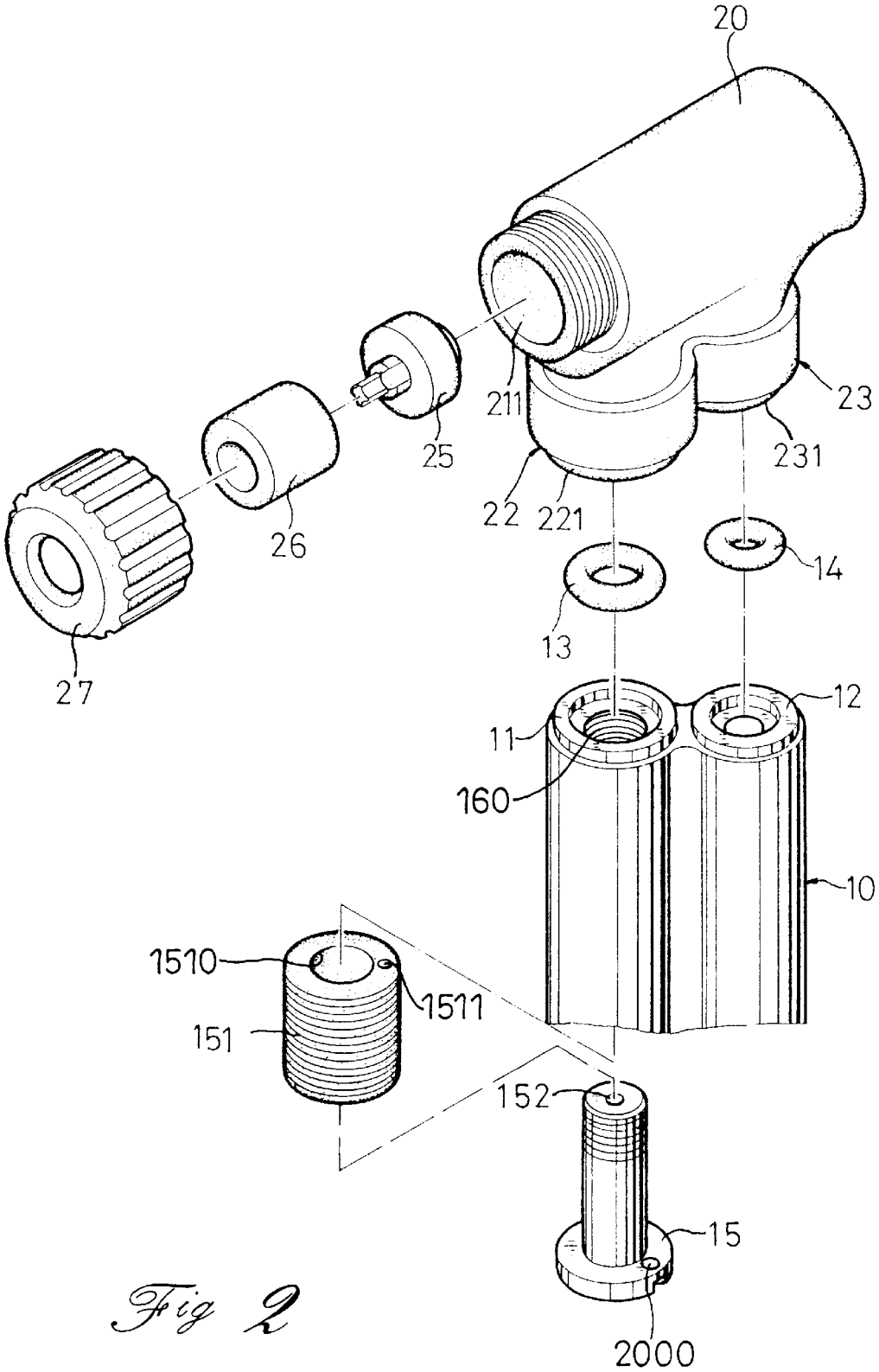
FIG. 2 is an exploded view of the bicycle tire pump in accordance with *the* present invention.
Figure 3:
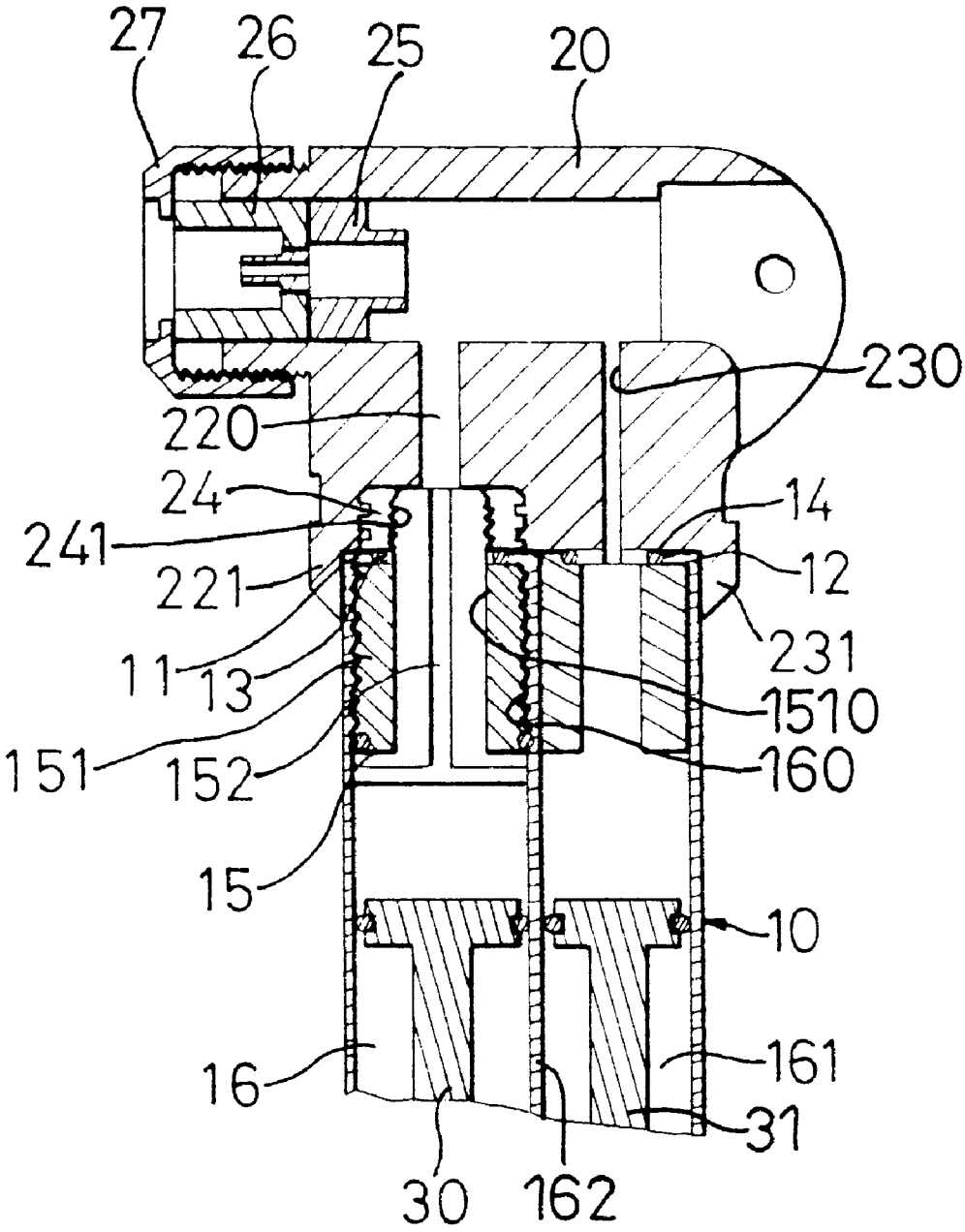
FIG. 3 is a side elevational view, partly in section, of the bicycle tire pump in accordance with the present invention[, and]*;*

Referring to FIGS. 1 through 3, the bicycle tire pump in accordance with the present invention comprises a non-circular 10 having two passages 16, 161 defined therethrough which are separated by a board 162, two openings respectively defined in a top of the cylinder 10 and communicating with the two passages 16, 161. Each of the two openings is enclosed by [a] *an* annular lip 11/12, and two pistons 30, 31 are respectively and movably received in the two passages 16, 161. The passage 16 has a threaded inner periphery 160 defined near the top of the cylinder 10 so as to be threadedly engaged with the sleeve member 151 which has a central hole 1510 defined therethrough.

A head 20 is mounted to the top of the cylinder 10 and has an outlet 211 defined in one of two ends thereof. A valve 25 is received in the outlet 211 and the head 20 has two ways 220, 230 defined therein which respectively communicate with the two passages 16, 161 so that when operating the two pistons 30, 31, pressurized air enters the head 20 via the two ways 220, 230 and into the tire (not shown) to be inflated via the valve 25. A tubular member 26 is received in the outlet 211 and mounted to the valve 25[, a]. *A* cap 27 *is* threadedly mounted to the end *of the head 20* having the valve 25. Two necks 22, 23 respectively extend from a lower portion of the head 20 and each of which has a skirt portion 221/231. A connecting member 24 is fixedly received in the head 20 and has a threaded hole 241 defined centrally therethrough.

A bolt 15 extends through the passage 16 and the central hole 1510 of the [and] sleeve member 151, and the bolt 15 is threadedly connected with the threaded hole 241 of the connecting member 24. The bolt 15 further has a longitudinal passage 152 defined therethrough which communicates with one of the two ways 220, 230.

Two seals 13, 14 are respectively received between the two necks 22, 23 and two annular lips 11, 12 when the head 20 is mounted to the cylinder 10 so as to prevent leaking between the cylinder 10 and the head 20. Accordingly, pressurized air flows through the longitudinal passage 152 of the bolt 15, the two ways 220, 230 and out from the valve 25. The engagement between the bolt 15 and the connecting member 24 provides a secure connection between the head 20 and the cylinder 10. It is to be noted that the two skirt portions 221, 231 can also [to connect] *be connected* to the cylinder 10 by glue, and there may [have] *be* two sets of the connecting member 24, the sleeve member 151 and the bolt

15 so as to enhance the connection between the head 20 and the cylinder 10.

Figure 4:
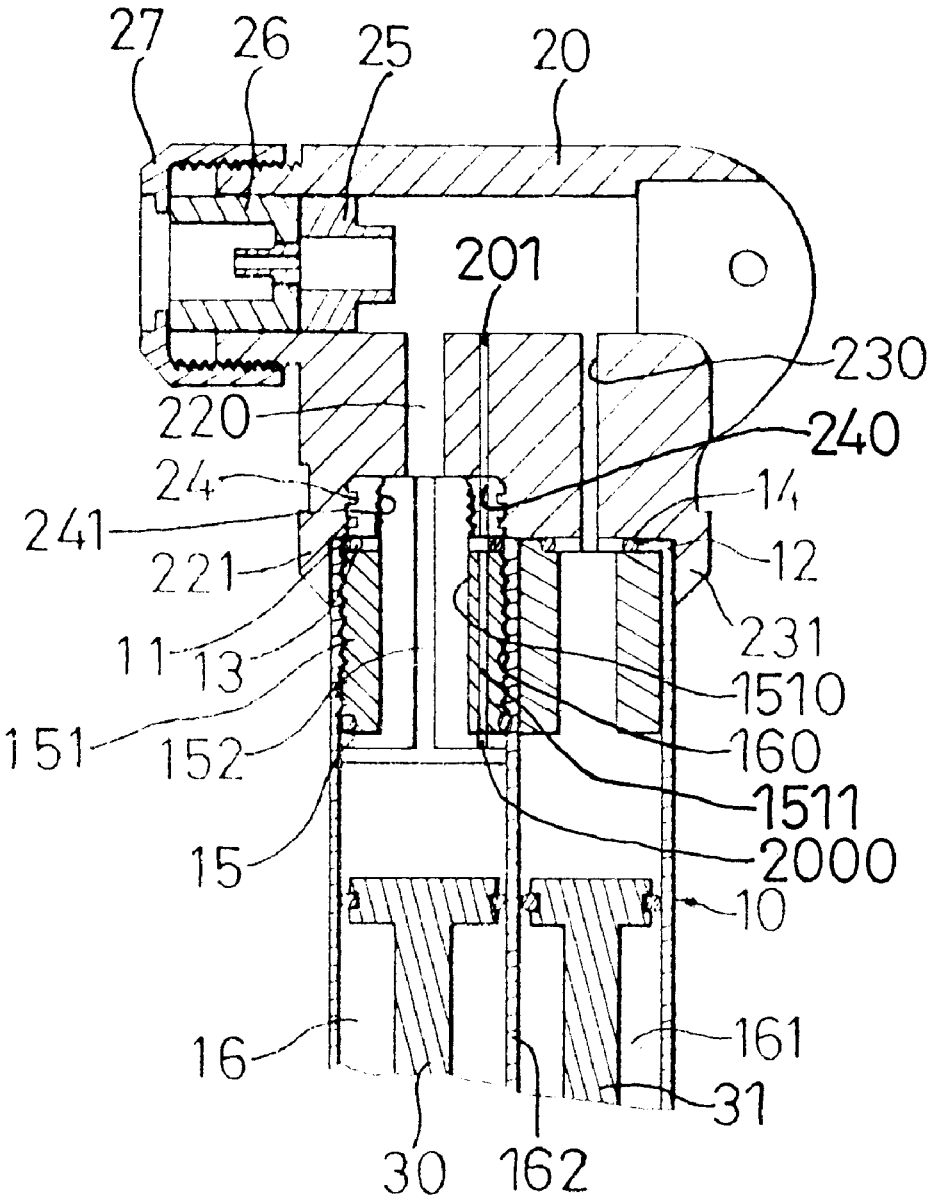
FIG. 4 is a side elevational view, partly in section, of another embodiment of the bicycle tire pump in accordance with the present invention[,]*.
Figure 5:
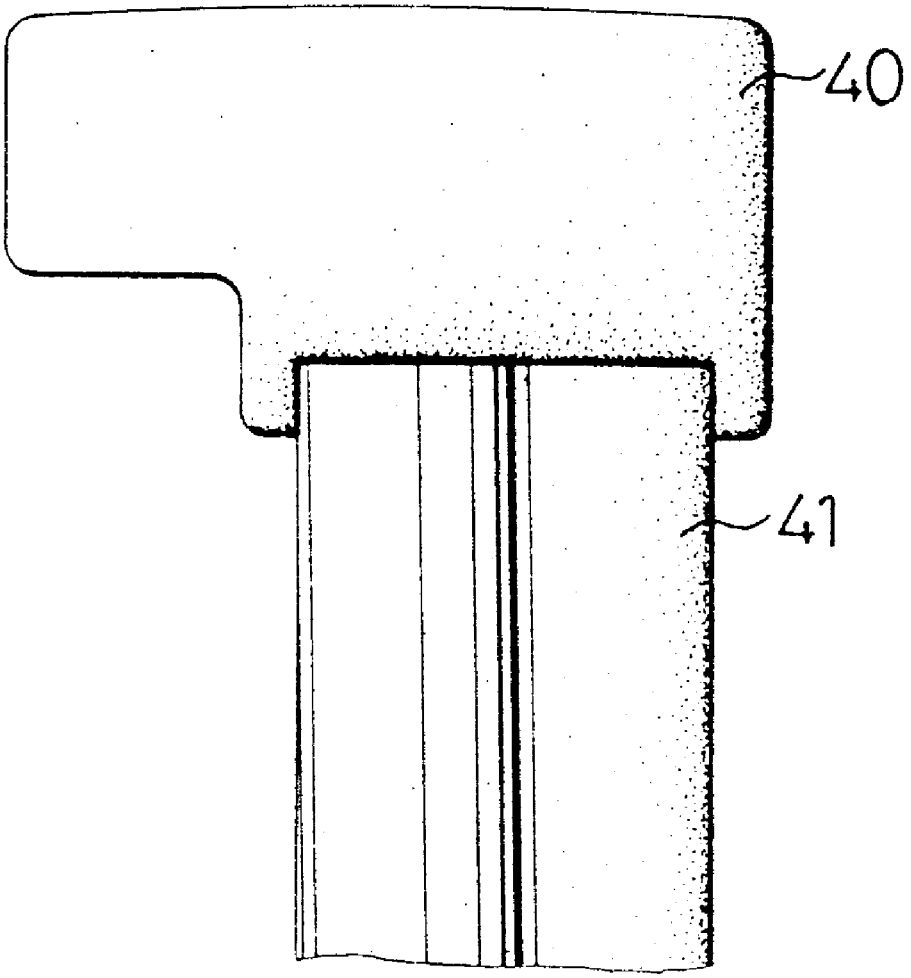
* and FIG. 5 is an illustrative view to illustrate the conventional bicycle tire pump.

Referring to FIG. 4, in order to have more passages or paths for the pressurized air to pass, a further way 201 is further defined through the body of the head 20 and located in parallel with the two ways 220, 230. The sleeve member 151 and the connecting member 24 may have further paths 1511 and 240 respectively defined therethrough, wherein the paths 1511, 240 and the way 201 are located in alignment with each other. The way 201 communicates with the valve 25, and the path 1511 communicates with the passage 16 *through a hole 2000 in the bolt 15*. Accordingly, a large amount of air can enter the head 20 during one operation of the two pistons 30, 31.

The invention is not limited to the above embodiment but various [modification] *modifications* thereof may be made. It will be understood by those skilled in the art that various changes in form and detail may *be* made without departing from the scope and spirit of the present invention.

What is claimed is:

1. A bicycle tire pump comprising:

a cylinder having two passages defined therethrough which are separated by a board, two openings respectively defined in a top of said cylinder and communicating with said two passages, two pistons respectively and movably received in said two passages;

a head mounted to said top of said cylinder and having an outlet defined in one of two ends thereof, a valve received in said outlet and two ways defined in said head and respectively communicating with said two passages, and a bolt extending through one of said two passages and threadedly connected to said head, said bolt having a longitudinal passage defined therethrough which communicates with one of said two ways.

2. The bicycle tire pump as claimed in claim 1 further comprising a connecting member fixedly received in the head, said connecting member having a threaded hole defined centrally therethrough so that said bolt is threadedly *engaged* with said threaded hole.

3. The bicycle tire pump as claimed in claim 1 further comprising a sleeve member fixedly received in said passage where the bolt extends, said bolt extending [thorough] *through* said sleeve member.

4. The bicycle tire pump as claimed in claim 3, wherein said sleeve member is threadedly received in said passage.

5. The bicycle tire pump as claimed in claim 1, wherein said head has a skirt portion in which said top of said cylinder is received.

6. A bicycle tire pump comprising:

a cylinder having two passages defined therethrough which are separated by a board, two openings respectively defined in a top of said cylinder and communicating with said two passages, two pistons respectively and movably received in said two passages;

a head mounted to said top of said cylinder and having an outlet defined in one of two ends thereof, a valve received in said outlet and two ways defined in said head and respectively communicating with said two passages;

a sleeve member fixedly received in one of said two passages and a bolt extending through said sleeve member and threadedly connected to said head, and a first path defined through said sleeve member and said bolt and a second path defined in said head and communicating with said first path, said first path communicating with said passage having said sleeve member and said bolt and said second path communicating with said valve.

7. The bicycle tire pump as claimed in claim 6 further comprising a connecting member fixedly received in the head, said connecting member having a threaded hole defined centrally therethrough so that said bolt is threadedly *engaged* with said threaded hole.

8. The bicycle tire pump as claimed in claim 6, wherein said sleeve member is threadedly received in said passage.

9. The bicycle tire pump as claimed in claim 6, wherein said head has a skirt portion in which said top of said cylinder is received.

10. The bicycle tire pump as claimed in claim 6, wherein said bolt has a longitudinal passage defined therethrough which communicates with one of said two ways.

*11. A bicycle tire pump comprising:*

*a cylinder including a non-circular outer periphery, the cylinder including an interior;*

*at least a first piston movably received in the interior of the cylinder;*

*a head directly mounted on top of the cylinder in a nonrotatable manner and including an outlet that is communicated with the interior of the cylinder; and*

*means mounted in the interior of the cylinder and having a first end securely retained in the interior of the cylinder and a second end extended beyond the cylinder for securely engaging with the head, with the head and the outlet being separable from the cylinder only by removal of the engaging means.*

*12. The bicycle tire pump as claimed in claim 11, wherein said engaging means is a bolt, and wherein the head includes a threaded hole for engaging with the bolt.*

*13. The bicycle tire pump as claimed in claim 12, further comprising a sleeve member securely mounted in the interior of the cylinder, the sleeve member including a longitudinal hole through which the bolt extends.*

*14. The bicycle tire pump as claimed in claim 13, wherein the sleeve member is threadedly received in the interior of the cylinder.*

*15. The bicycle tire pump as claimed in claim 11, wherein the head has a skirt portion in which the top of the cylinder is received.*

*16. The bicycle tire pump as claimed in claim 11, wherein said engaging means is a bolt, and wherein the head includes a connecting member fixedly mounted therein, the connecting member including a threaded hole for engaging with the bolt.*

*17. The bicycle tire pump as claimed in claim 11, wherein the interior of the cylinder is cylindrical.*

*18. The bicycle tire pump as claimed in claim 11, wherein the head includes two necks extending from a lower portion thereof, said necks being integral with the head and configured for engaging with the non-circular outer periphery of the cylinder, the second end of the engaging means being engaged with one of said necks.*

*19. A bicycle tire pump comprising:*

*a cylinder including a non-circular outer periphery, the cylinder including an interior;*

*at least a first piston movably received in the interior of the cylinder;*

*a head mounted on top of the cylinder and including an outlet that is communicated with the interior of the cylinder; and*

*means mounted in the interior of the cylinder and having a first end securely retained in the interior of the cylinder and a second end extended beyond the cylinder for securely engaging with the head, wherein the interior of the cylinder includes two passages defined therethrough, the two passages being separated by a board, the head including two ways that are communicated with the outlet and that are communicated with the passages, respectively;*

*said engaging means being a bolt extending through one of the passages of the cylinder and one of the ways of the head and threadedly connected with the head.*

*20. The bicycle tire pump as claimed in claim 19, wherein the bolt comprises a longitudinal hole that communicates said one of the passages of the cylinder with said one of the ways of the head.*

*21. The bicycle tire pump as claimed in claim 20, further comprising a sleeve member securely mounted in said one of the passages of the cylinder, the sleeve member including a longitudinal hole through which the bolt extends.*

*22. The bicycle tire pump as claimed in claim 21, wherein the sleeve member is threadedly received in said one of the passages of the cylinder.*

*23. The bicycle tire pump as claimed in claim 19, wherein the head has a skirt portion in which the top of the cylinder is received.*

*24. The bicycle tire pump as claimed in claim 19, wherein the head includes a connecting member fixedly mounted therein, the connecting member including a threaded hole for engaging with the bolt.*

* * * * *